United States Patent
Kushida

(10) Patent No.: US 10,822,477 B2
(45) Date of Patent: Nov. 3, 2020

(54) RUBBER COMPOSITION FOR TIRE

(71) Applicant: THE YOKOHAMA RUBBER CO., LTD., Tokyo (JP)

(72) Inventor: Naoki Kushida, Hiratsuka (JP)

(73) Assignee: The Yokohama Rubber Co., Ltd., Tokyo (JP)

( * ) Notice: Subject to any disclaimer, the term of this patent is extended or adjusted under 35 U.S.C. 154(b) by 140 days.

(21) Appl. No.: 16/300,284

(22) PCT Filed: Apr. 21, 2017

(86) PCT No.: PCT/JP2017/015989
§ 371 (c)(1),
(2) Date: Nov. 9, 2018

(87) PCT Pub. No.: WO2017/195567
PCT Pub. Date: Nov. 16, 2017

(65) Prior Publication Data
US 2019/0136019 A1 May 9, 2019

(30) Foreign Application Priority Data
May 12, 2016 (JP) ................................. 2016-096442

(51) Int. Cl.
| | | |
|---|---|---|
| C08L 9/06 | (2006.01) |
| C08K 3/04 | (2006.01) |
| C08K 3/36 | (2006.01) |
| C08K 5/40 | (2006.01) |
| C08L 21/00 | (2006.01) |
| B60C 1/00 | (2006.01) |
| C08L 45/00 | (2006.01) |
| C08K 5/18 | (2006.01) |
| C08K 5/47 | (2006.01) |
| C08K 5/548 | (2006.01) |
| C08K 3/22 | (2006.01) |
| C08L 91/00 | (2006.01) |
| C08K 5/09 | (2006.01) |
| C08K 3/06 | (2006.01) |
| C08L 47/00 | (2006.01) |

(52) U.S. Cl.
CPC .................. C08L 9/06 (2013.01); B60C 1/00 (2013.01); B60C 1/0016 (2013.01); C08K 3/04 (2013.01); C08K 3/06 (2013.01); C08K 3/22 (2013.01); C08K 3/36 (2013.01); C08K 5/09 (2013.01); C08K 5/18 (2013.01); C08K 5/40 (2013.01); C08K 5/47 (2013.01); C08K 5/548 (2013.01); C08L 21/00 (2013.01); C08L 45/00 (2013.01); C08L 47/00 (2013.01); C08L 91/00 (2013.01); Y02T 10/86 (2013.01)

(58) Field of Classification Search
CPC .. C08L 9/06; C08L 47/00; C08L 45/00; C08L 21/00; C08L 91/00; C08K 3/04; C08K 3/22; C08K 5/09; C08K 5/40; C08K 3/36; C08K 5/18; C08K 5/548; C08K 3/06; C08K 5/47; B60C 1/00; B60C 1/0016; Y02T 10/862
See application file for complete search history.

(56) References Cited

U.S. PATENT DOCUMENTS

| 7,897,665 B2 | 3/2011 | Kameda et al. | |
| 8,507,582 B2 | 8/2013 | Takizawa | |
| 2013/0237653 A1* | 9/2013 | Takizawa | C08L 9/06 524/261 |
| 2015/0259515 A1* | 9/2015 | Takizawa | C08L 9/06 524/525 |

FOREIGN PATENT DOCUMENTS

| JP | 2006-152197 A | 6/2006 |
| JP | 2010-031262 A | 2/2010 |
| JP | 2010-126671 A | 6/2010 |
| JP | 2011-001435 A | 1/2011 |
| JP | 5831300 B2 | 12/2015 |

* cited by examiner

Primary Examiner — Angela C Scott
(74) Attorney, Agent, or Firm — Carrier Blackman & Associates, P.C.; Joseph P. Carrier; Anne G. Sabourin

(57) ABSTRACT

A tire rubber composition is produced by compounding from 1 to 50 parts by mass of silica, carbon black in an amount not less than the amount of silica, and from 10 to 30 parts by mass of a hydrocarbon resin having a softening point from 100 to 140° C. with 100 parts by mass of a diene rubber containing not less than 5 mass % and less than 30 mass % of a styrene-butadiene rubber, wherein the styrene-butadiene rubber has a styrene content from 30 to 40 mass %, a glass transition temperature from −20 to −5° C., and a weight average molecular weight from 1000000 to 1800000; a nitrogen adsorption specific surface area of the carbon black is from 200 to 400 m$^2$/g; and a nitrogen adsorption specific surface area of the carbon black is greater than a nitrogen adsorption specific surface area of the silica.

16 Claims, 1 Drawing Sheet

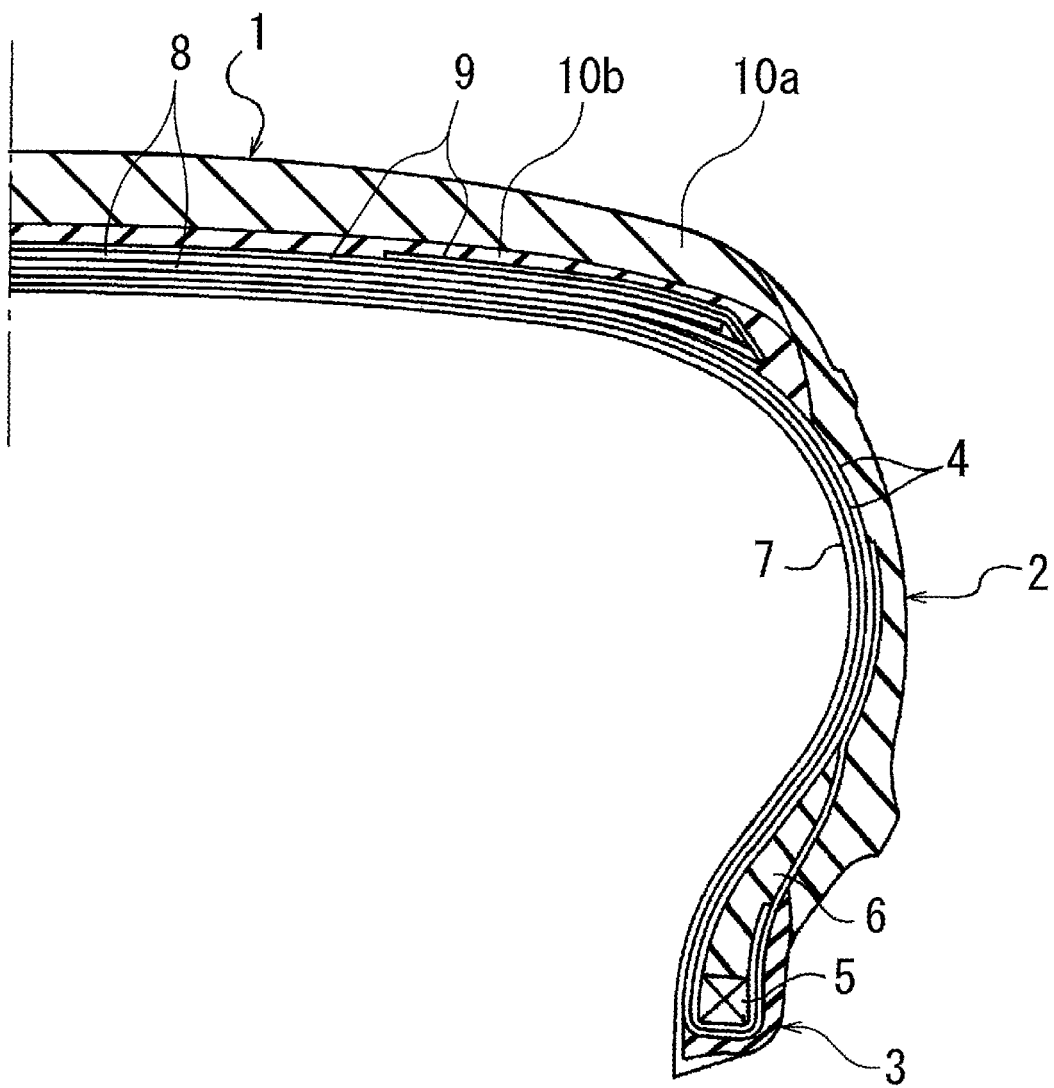

RUBBER COMPOSITION FOR TIRE

TECHNICAL FIELD

The present invention relates to a tire rubber composition for forming a pneumatic tire that can be used for traveling on both race tracks and on ordinary roads.

BACKGROUND ART

The performance required of pneumatic tires for high-performance automobiles that travel on race tracks and the like is wide-ranging. In particular, the tires are required to have excellent steering stability when traveling at high speeds (dry grip performance), stability on wet road surfaces (wet grip performance), and a high level of wear resistance. In addition, depending on the driver, a vehicle equipped with tires used on a race track or the like may also travel over ordinary roads without any change in the tires.

However, in recent years, regulations have been imposed which require pneumatic tires that travel on general roads to have low rolling resistance, excellent fuel economy performance, and excellent wear resistance from the perspective of environmental impact reduction (for example, ECE R117-02 Regulation) Therefore, pneumatic tires for traveling on race tracks are sometimes required to be enabled to travel on general roads by enhancing the low rolling resistance or wear resistance.

Patent Document 1 proposes a tire rubber composition for a tire tread which enhances steering stability when traveling at high speeds, duration of high-speed traveling performance, wet performance, and wear resistance by compounding from 40 to 80 parts by mass of carbon black having a nitrogen adsorption specific surface area from 130 to 400 $m^2/g$, from 30 to 90 parts by mass of silica, and from 2 to 10 parts by mass of an aromatic modified terpene resin with 100 parts by mass of a styrene-butadiene rubber containing (a) from 30 to 70 mass % of a solution-polymerized styrene-butadiene rubber S-SBR 1 having a styrene content from 30 to 38 mass %, a vinyl content from 60 to 80 mass %, a glass transition temperature from −20 to −5° C., and a weight average molecular weight from 1000000 to 1800000 and (b) from 70 to 30 parts by mass of a solution-polymerized styrene-butadiene rubber S-SBR 2 having a glass transition temperature of not less than −30° C. and less than −20° C. and a weight average molecular weight from 1000000 to 1800000. However, although this tire rubber composition for a tire tread exhibits excellent grip performance, it has a large rolling resistance and thus is not geared for travel over ordinary roads.

CITATION LIST

Patent Literature

Patent Document 1: JP 5831300 B

SUMMARY OF INVENTION

Technical Problem

An object of the present invention is to provide a tire rubber composition which achieves both dry grip performance and wet grip performance when traveling on race tracks as well as low rolling resistance when traveling on ordinary roads.

Solution to Problem

The tire rubber composition of the present invention which achieves the object described above is a tire rubber composition produced by compounding from 1 to 50 parts by mass of silica, carbon black in an amount not less than the amount of silica, and from 10 to 30 parts by mass of a hydrocarbon resin having a softening point from 100 to 140° C. with 100 parts by mass of a diene rubber containing not less than 5 mass % and less than 30 mass % of a styrene-butadiene rubber, wherein the styrene-butadiene rubber has a styrene content from 30 to 40 mass %, a glass transition temperature from −20 to −5° C., and a weight average molecular weight from 1000000 to 1800000; a nitrogen adsorption specific surface area of the carbon black is from 200 to 400 $m^2/g$; and the nitrogen adsorption specific surface area of the carbon black is greater than a nitrogen adsorption specific surface area of the silica.

ADVANTAGEOUS EFFECTS OF INVENTION

Since the tire rubber composition of the present invention is produced by compounding from 10 to 30 parts by mass of a hydrocarbon resin having a softening point from 100 to 140° C., from 1 to 50 parts by mass of silica, and carbon black having a nitrogen adsorption specific surface area from 200 to 400 $m^2/g$ in an amount not less than the amount of the silica with 100 parts by mass of a diene rubber containing not less than 5 mass % and less than 30 mass % of a styrene-butadiene rubber having a styrene content from 30 to 40 mass %, a glass transition temperature from −20 to −5° C., and a weight average molecular weight from 1000000 to 1800000, it is possible to achieve both dry grip performance and wet grip performance when traveling on race tracks as well as low rolling resistance when traveling on ordinary roads.

The styrene-butadiene rubber is preferably a solution-polymerized styrene-butadiene rubber, and the tire rubber composition preferably further contains from 70 to 95 mass % of an emulsion-polymerized styrene-butadiene rubber per 100 mass % of the diene rubber. The hydrocarbon resin is preferably an aromatic modified terpene resin, and the softening point thereof is preferably from 105 to 130° C. A thiuram-based vulcanization accelerator is preferably further compounded in an amount from 0.5 to 5 parts by mass per 100 parts by mass of the diene rubber.

The rubber composition described above is suitable for forming a tread of a pneumatic tire. A pneumatic tire including this tire rubber composition can achieve both dry grip performance and wet grip performance when traveling on race tracks as well as low rolling resistance when traveling on ordinary roads.

BRIEF DESCRIPTION OF DRAWING

FIG. 1 is a partial cross-sectional view in a tire meridian direction that illustrates an example of an embodiment of a pneumatic tire in which a rubber composition of the present invention is used.

DESCRIPTION OF EMBODIMENTS

FIG. 1 is a cross-sectional view that illustrates an example of an embodiment of a pneumatic tire in which a rubber composition is used. The pneumatic tire includes a tread portion 1, a sidewall portion 2, and a bead portion 3.

In FIG. 1, two layers of a carcass layer 4, formed by arranging reinforcing cords extending in a tire circumferential direction at a predetermined pitch in the tire circumferential direction and embedding these reinforcing cords in a rubber layer, extend between left and right bead portions 3. Both ends of the carcass layer 4 are made to sandwich a bead filler 6 and are folded back around a bead core 5 that is embedded in the bead portions 3 in a tire axial direction from the inside to the outside. An innerliner layer 7 is disposed inward of the carcass layer 4. Two layers of a belt layer 8, formed by arranging reinforcing cords extending inclined to the tire circumferential direction in the tire axial direction at a predetermined pitch and embedding these reinforcing cords in a rubber layer, is disposed on an outer circumferential side of the carcass layer 4 of the tread portion 1. The inclination direction with respect to the tire circumferential direction of the reinforcing cords of the two belt layers 8 intersect so as to be opposite each other in the tire circumferential direction. A belt cover layer 9 is disposed outward of the belt layers 8. The tread portion 1 is formed from tread rubber layers 10a and 10b on the outer circumferential side of the belt cover layer 9. The tread rubber layers 10a and 10b are a cap tread and a base tread and are preferably formed from the rubber composition of the present invention.

In the tire rubber composition of the present invention, the rubber component is a diene rubber containing a styrene-butadiene rubber having a high molecular weight and a high glass transition temperature. This styrene-butadiene rubber may be either a solution-polymerized styrene-butadiene rubber or an emulsion-polymerized styrene-butadiene rubber but is preferably a solution-polymerized styrene-butadiene rubber. This styrene-butadiene rubber having a high molecular weight and a high glass transition temperature is also called "SBR 1" hereinafter.

SBR 1 is a styrene-butadiene rubber having a styrene content from 30 to 40 mass %, a glass transition temperature (referred to as "Tg" hereinafter) from −20 to −5° C., and a weight average molecular weight (referred to as "Mw" hereinafter) from 1000000 to 1800000 and is preferably a solution-polymerized styrene-butadiene rubber.

The styrene content of SBR 1 is from 30 to 40 mass % or preferably from 32 to 38 mass %. When the styrene content of SBR 1 is less than 30 mass %, the rubber strength will decrease, and the grip performance will also be diminished. When the styrene content of SBR 1 exceeds 40 mass %, the wear resistance will be negatively affected. Note that the styrene content of SBR 1 is measured using $^1$H-NMR.

The Tg of SBR 1 is from −20° C. to −5° C. or is preferably from −18° C. to −7° C. When the Tg of SBR 1 is lower than −20° C., the dry grip performance and the wet grip performance will be diminished. When the Tg of SBR 1 is higher than −5° C., the wear resistance will be negatively affected. Note that in this specification, the Tg of SBR 1 is measured using a thermograph by differential scanning calorimetry (DSC) at a temperature elevation speed of 20° C./minute. The temperature at the midpoint of the transition region is set as the glass transition temperature thereof. Furthermore, when SBR 1 is an oil-extended product, the glass transition temperature is a glass transition temperature of SBR 1 in a state free of an oil-extending component (oil).

The Mw of SBR 1 is from 1000000 to 1800000 or is preferably from 1200000 to 1600000. When the Mw of SBR 1 is less than 1000000, the rubber strength will decrease. When the Mw exceeds 1800000, the ease of processing of the rubber composition will be negatively affected. Note that in this specification, the Mw of SBR 1 is measured via gel permeation chromatography (GPC) in terms of a polystyrene standard.

The vinyl content of SBR 1 is preferably from 60 to 80 mass % or more preferably from 62 to 70 mass %. When the vinyl content of SBR 1 is less than 60 mass %, the grip performance may decrease. Also, when the vinyl content of SBR 1 exceeds 80 mass %, it will become too hard and the grip performance will decrease. Note that the vinyl content of SBR 1 is measured using $^1$H-NMR.

The content of SBR 1 in 100 mass % of the styrene-butadiene rubber is not less than 5 mass % and less than 30 mass % or preferably from 8 to 27 mass %. When the content of SBR 1 is less than 5 mass %, the wet performance deteriorates. When the content of SBR 1 is not less than 30 mass %, the rolling resistance becomes large and the fuel economy performance becomes poor.

The tire rubber composition of the present invention may contain another diene rubber other than the styrene-butadiene rubber SBR 1. Examples of such another diene rubber include natural rubber (NR), polyisoprene rubber (IR), solution-polymerized styrene-butadiene rubber or emulsion-polymerized styrene-butadiene rubber which does not satisfy one or more requirements of styrene content, Tg, or Mw defined by the present invention with regard to the styrene-butadiene rubber, polybutadiene rubber (low-cis BR), high-cis BR, high-trans BR (trans bond content of the butadiene part: 70 to 95%), styrene-isoprene copolymer rubber, butadiene-isoprene copolymer rubber, solution-polymerized random styrene-butadiene-isoprene copolymer rubber, emulsion-polymerized random styrene-butadiene-isoprene copolymer rubber, emulsion-polymerized styrene-acrylonitrile-butadiene copolymer rubber, acrylonitrile-butadiene copolymer rubber, high-vinyl SBR/low-vinyl SBR block copolymer rubber, polyisoprene-SBR block copolymer rubber, and polystyrene-polybutadiene-polystyrene block copolymers. Of these, a solution-polymerized styrene-butadiene rubber or an emulsion-polymerized styrene-butadiene rubber that does not satisfy one or more of the requirements of styrene content, Tg, or Mw is preferable, and an emulsion-polymerized styrene-butadiene rubber is particularly preferable.

An emulsion-polymerized styrene-butadiene rubber that is suitable as a diene rubber other than SBR 1 (also called "SBR 2" hereinafter) preferably has a Tg of not lower than −40° C. and lower than −20° C. and a Mw from 600000 to 1200000.

The Tg of SBR 2 is preferably not lower than −40° C. and lower than −20° C. or more preferably from −38 to −22° C. When the Tg of SBR 2 is lower than −40° C., the grip performance may decrease. When the Tg of SBR 2 is higher than −20° C., the wear resistance may be negatively affected.

The Mw of SBR 2 is preferably from 600000 to 1200000 or more preferably from 650000 to 1,150000. When the Mw of SBR 2 is less than 600000, the rubber strength may decrease. When the Mw exceeds 1200000, the processability of the rubber composition may be negatively affected.

The content of the other diene rubber is preferably greater than 70 mass % and not greater than 95 mass % or more preferably from 73 to 92 mass % per 100 mass % of the diene rubber. By containing another diene rubber, various physical properties such as the wear resistance can be enhanced.

Since the tire rubber composition of the present invention contains a hydrocarbon resin having a softening point from 100 to 140° C., the dry grip performance, the wet grip performance, and the rolling resistance can be enhanced.

The softening point of the hydrocarbon resin is preferably from 105 to 130° C. When the softening point of the hydrocarbon resin is lower than 100° C., the effect of enhancing the grip performance cannot be achieved, and the dry grip performance, in particular, is diminished. In addition, when the softening point of the hydrocarbon resin exceeds 140° C., the rolling resistance becomes large. The softening point of the hydrocarbon resin is expressed as a value measured in accordance with Japanese Industrial Standard (JIS) K6220-1 (ring and ball method).

The compounded amount of the hydrocarbon resin is from 10 to 30 or preferably from 13 to 28 parts by mass per 100 parts by mass of the diene rubber. When the compounded amount of the hydrocarbon resin is less than 10 parts by mass, the dry grip performance and the wet grip performance cannot be sufficiently enhanced. Furthermore, when the compounded amount of the hydrocarbon resin is less than 30 parts by mass, the rolling resistance becomes large.

The hydrocarbon resin is not particularly limited, but examples thereof include natural resins such as terpene resins and rosin resins; synthetic resins such as petroleum resins, carboniferous resins, phenol resins, and xylene resins; and modified products thereof. Among these, terpene resins and/or petroleum resins are preferable, and modified products of terpene resins are particularly preferable.

Preferred examples of the terpene resins include α-pinene resin, β-pinene resin, limonene resin, hydrogenated limonene resin, dipentene resin, terpene phenol resin, terpene styrene resin, aromatic modified terpene resin, and hydrogenated terpene resin. Among these, aromatic modified terpene resins are preferable.

The aromatic modified terpene resin is obtained by polymerizing a terpene and an aromatic compound. Examples of the terpene include α-pinene, β-pinene, dipentene, and limonene. Examples of the aromatic compound include styrene, α-methylstyrene, vinyl toluene, and indene. Among these, styrene modified terpene resins are preferable as the aromatic modified terpene resin. Such an aromatic modified terpene resin enhances the dynamic visco-elasticity of the rubber composition and can enhance the wet grip performance and heat build-up due to the excellent miscibility with the diene rubber.

Examples of the petroleum resins include aromatic hydrocarbon resins or, alternatively, saturated or unsaturated aliphatic hydrocarbon resins. Examples thereof include $C^5$ petroleum resins (aliphatic petroleum resins formed by polymerizing fractions such as isoprene, 1,3-pentadiene, cyclopentadiene, methylbutene, and pentene), $C^9$ petroleum resins (aromatic petroleum resins formed by polymerizing fractions such as α-methylstyrene, o-vinyl toluene, m-vinyl toluene, and p-vinyl toluene), and $C^5$-$C^9$ copolymerization petroleum resins.

The tire rubber composition of the present invention contains carbon black and silica. By compounding prescribed amounts of specific carbon black and silica, it is possible to achieve both the dry grip performance and wet grip performance as well as low rolling resistance of the rubber composition.

The nitrogen adsorption specific surface area ($N_2SA$) of the carbon black is from 200 to 400 m$^2$/g or preferably from 210 to 390 m$^2$/g. When the $N_2SA$ of the carbon black is less than 200 m$^2$/g, the grip performance will decrease. When the $N_2SA$ of the carbon black exceeds 400 m$^2$/g, the wear resistance will be negatively affected. The $N_2SA$ of the carbon black is determined in accordance with JIS K6217-2.

The nitrogen adsorption specific surface area ($N_2SA$) of the silica compounded with the tire rubber composition of the present invention is smaller than the $N_2SA$ of the carbon black described above. That is, by making the $N_2SA$ of the carbon black greater than the $N_2SA$ of the silica, it is possible to enhance the dry grip performance while maintaining the wet grip performance and the low rolling resistance at excellent levels.

The $N_2SA$ of the silica is not particularly limited as long as it is smaller than the $N_2SA$ of the carbon black, but the $N_2SA$ is preferably from 100 to 300 m$^2$/g or more preferably from 110 to 290 m$^2$/g. The $N_2SA$ of the silica is determined in accordance with JIS K6217-2.

The silica that is used may be a silica that is ordinarily used in rubber compositions for tires such as, for example, wet silica, dry silica, surface-treated silica, or the like.

The compounded amount of the silica is from 1 to 50 parts by mass or preferably from 2 to 49 parts by mass per 100 parts by mass of the diene rubber. When the compounded amount of the silica is less than 1 part by mass, the wet grip performance cannot be enhanced, and the rolling resistance cannot be made small. In addition, when the compounded amount of the silica exceeds 50 parts by mass, the wear resistance is diminished.

The compounded amount of the carbon black is greater than the compounded amount of the silica. That is, the compounded amount of the carbon black is not less than 50 mass % or preferably from 52 to 85 mass % per 100% of the total of the compounded amount of the carbon black and the compounded amount of the silica. By compounding the carbon black in an amount of not less than 50 mass % relative to the total amount of the carbon black and the silica, excellent dry grip performance can be achieved.

The total amount of the compounded amount of the carbon black and the compounded amount of the silica is not particularly limited but is preferably from 50 to 200 parts by mass or more preferably from 60 to 180 parts by mass per 100 parts by mass of the diene rubber. By setting the total amount of the carbon black and the silica to within such a range, even better grip performance can be achieved when traveling at high speeds.

By compounding a silane coupling agent together with the silica in the tire rubber composition of the present invention, the dispersibility of the silica can be enhanced, and the reinforcing properties for the diene rubber can be further enhanced. The silane coupling agent is compounded in an amount of preferably from 2 to 20 mass % or more preferably from 5 to 15 mass % of the compounded amount of the silica. When the compounded amount of the silane coupling agent is less than 2 mass % of the compounded amount of the silica, the effect of enhancing the dispersibility of the silica cannot be sufficiently achieved. Additionally, when the compounded amount of the silane coupling agent exceeds 20 mass %, the silane coupling agents will polymerize, and the desired effects cannot be obtained.

The silane coupling agent is not particularly limited, but a sulfur-containing silane coupling agent is preferable, and examples thereof include bis(3-triethoxysilylpropyl)tetrasulfide, bis(3-triethoxysilylpropyl)trisulfide, bis(3-triethoxysilylpropyl)disulfide, bis(2-triethoxysilylethyl)tetrasulfide, bis(3-trimethoxysilylpropyl)tetrasulfide, bis(2-trimethoxysilylethyl)tetrasulfide, 3-mercaptopropyltrimethoxysilane, 3-mercaptopropyldimethoxymethylsilane, 3-mercaptopropyldimethylmethoxysilane, 2-mercaptoethyltriethoxysilane, 3-mercaptopropyltriethoxysilane, the mercaptosilane compounds disclosed in JP 2006-249069 A such as VP Si363 available from Evonik Industries, 3-trimethoxysilylpropyl benzothiazole tetrasulfide, 3-triethoxysilylpropyl benzothiazolyltetrasulfide, 3-triethoxysilylpropyl methacrylate monosulfide, 3-trimethoxysilylpropyl methacrylate monosulfide, 3-trimethoxysilylpropyl-N,N-dimethylthiocarbamoyl tetrasulfide, 3-triethoxysilylpropyl-N,N-dimethylthiocarbamoyl tetrasulfide, 2-triethoxysilylethyl-N,N-dimethylthiocarbamoyl tetrasulfide, bis(3-diethoxymethylsilylpropyl)tetrasulfide, dimethoxymethylsilylpropyl-N,N-dimethylthiocarbamoyltetrasulfide, dimethoxymethylsilylpropylbenzothiazolyltetrasulfide, 3-octanoylthiopropyl triethoxysilane, 3-propionylthiopropyl trimethoxysilane, vinyl trimethoxysilane, vinyl triethoxysilane, vinyl tris(2-methoxyethoxy)silane, 3-glycidoxypropyl trimethoxysilane, 3-glycidoxypropylmethyl dimethoxysilane, β-(3,4-epoxycyclohexyl)ethyl trimethoxysilane, 3-aminopropyl trimethoxysilane, N-(β-aminoethyl)-γ-aminopropyl trimethoxysilane, and N-(β-aminoethyl)-γ-aminopropylmethyldimethoxysilane. In addition, the silane coupling agent may be an organosilicon compound, and examples of the organosilicon compounds include polysiloxanes, and silicone oils in which one or more of organic groups such as an amino group, an epoxy group, a carbinol group, a mercapto group, a carboxyl group, a hydrogen group, a polyether group, a phenol group, a silanol group, an acryl group, a methacryl group, and a long-chain alkyl group are introduced into a side chain, both terminals, one terminal, or a side chain and both terminals of a polysiloxane. Of these, bis-(3-triethoxysilylpropyl)tetrasulfide and bis(3-(triethoxysilyl)propyl) disulfide are preferable.

In the present invention, the vulcanization accelerator is not particularly limited, but examples thereof include sulfenamide-based vulcanization accelerators, guanidine-based vulcanization accelerators, thiuram-based vulcanization accelerators, and thiazole-based vulcanization accelerators. These vulcanization accelerators may be used alone, or a plurality of vulcanization accelerators may be used in combination. A thiuram-based vulcanization accelerator is preferably compounded. Of these, a thiuram-based vulcanization accelerator and a sulfenamide-based vulcanization accelerator are preferably used in combination. By compounding a thiuram-based vulcanization accelerator, the steering stability and the duration of the grip performance can be further enhanced. Examples of the thiuram-based vulcanization accelerators include tetramethylthiuram disulfide, tetraethylthiuram disulfide, tetramethylthiurammonosulfide, tetrakis(2-ethylhexyl)thiuram disulfide, and tetrabenzylthiuram disulfide.

The compounded amount of the thiuram-based vulcanization accelerator is preferably from 0.1 to 5 parts by mass or more preferably from 0.5 to 3.0 parts by mass per 100 parts by mass of the diene rubber. When the compounded amount of the thiuram-based vulcanization accelerator is less than 0.1 parts by mass, the effect of enhancing the steering stability and the duration of the grip performance cannot be sufficiently achieved. In addition, when the compounded amount of the thiuram-based vulcanization accelerator exceeds 5 parts by mass, the rubber hardness of the rubber composition becomes too high.

The total amount of the oil components of the tire rubber composition of the present invention is preferably from 60 to 115 parts by mass or more preferably from 68 to 105 parts by mass per 100 parts by mass of the diene rubber. By setting the total amount of the oil components to within such a range, excellent wet grip performance and low rolling resistance can be achieved. Note that the total amount of the oil components refers to the total amount of oil components contained in the rubber composition, including oil components such as oil-extended oils in the diene rubber as well as natural oils, synthetic oils, and plasticizers added at the time of the preparation of the rubber composition.

The tire rubber composition of the present invention may also contain other fillers other than carbon black and silica. Examples of other fillers include inorganic fillers such as aluminum hydroxide, calcium carbonate, mica, talc, aluminum oxide, titanium oxide, and barium sulfate and organic fillers such as cellulose, lecithin, lignin, and dendrimers.

In addition to the components described above, the tire rubber composition of the present invention may also contain various compounding agents that are commonly used in tire rubber compositions in accordance with known methods. Examples thereof include vulcanization and crosslinking agents, vulcanization aids, plasticizers, liquid polymers, thermosetting resins, and thermoplastic resins. These compounding agents can be kneaded by a common method to obtain a tire rubber composition that can then be used for vulcanization or crosslinking. These compounding agents can be blended at known, general compounded amounts so long as the objects of the present invention are not hindered. The tire rubber composition can be prepared by mixing the above-mentioned components using a known rubber kneading machine such as a Banbury mixer, a kneader, a roller, or the like.

The tire rubber composition of the present invention can be suitably used as a rubber composition for a tread of a pneumatic tire. A pneumatic tire including a treat part formed from this rubber composition can enhance the steering stability, dry grip performance, and wet grip performance to or beyond conventional levels when traveling at high speeds on a race track or the like. In addition, when traveling on a general road (public road), the rolling resistance is small, and the fuel economy performance is excellent. Therefore, the tire is compliant with the regulations and the like of various countries required to travel on general roads.

The present invention is further explained below by Examples. However, the scope of the present invention is not limited to these Examples.

EXAMPLES

Eleven types of tire rubber compositions (Examples 1 to 4 and Comparative Examples 1 to 7) were prepared according to the formulations shown in Tables 1 and 2 with the compounding agents shown in Table 3 used as common components. With the exception of the sulfur and the vulcanization accelerators, the components were mixed for 6 minutes using a 1.8 L sealed Banbury mixer. The mixture was then discharged from the mixer at 150° C. and cooled to room temperature. Next, the mixture was mixed for 3 minutes using the 1.8 L sealed Banbury mixer again and then discharged. The sulfur and the vulcanization accelerators were then mixed in using an open roll to prepare a tire rubber composition.

Size 195/55R15 pneumatic tires were produced using the obtained tire rubber compositions for the tread portions. The dry grip performance, wet grip performance, and rolling resistance were evaluated with the following methods for these pneumatic tires.

Dry Grip Performance

The obtained pneumatic tires were respectively mounted on size 15×6J rims, filled to an air pressure of 200 kPa, and mounted on the four wheels of a test vehicle. A test driver drove the vehicle continuously for ten laps around a race trace course (approximately 2 km per lap) under dry conditions, and the lap time of each lap was measured. The obtained results are shown in the "Dry grip performance" rows of Tables 1 and 2 as index values with the value of Comparative Example 1 being defined as 100. Larger index values indicate faster average lap times and superior dry grip performance.

Wet Grip Performance

The obtained pneumatic tires were respectively mounted on size 15×6J rims, filled to an air pressure of 200 kPa, and mounted on the four wheels of a test vehicle. A test driver drove the vehicle continuously for ten laps around a race trace course (approximately 2 km per lap) under wet conditions, and the lap time of each lap was measured. The obtained results are shown in the "Wet grip performance" rows of Tables 1 and 2 as index values with the value of Comparative Example 1 being defined as 100. Larger index values indicate faster average lap times and superior wet grip performance.

Rolling Resistance

The obtained pneumatic tires were respectively mounted on size 15×6J rims and filled to an air pressure of 200 kPa. This was mounted on an indoor drum tester (drum diameter: 1706 mm) and pre-running was performed for 30 minutes at a speed of 80 km/h with a load of 4.5 kN, and then the rolling resistance values were measured. The obtained results are shown in the "Rolling resistance" rows of Tables 1 and 2 as index values with the value of Comparative Example 1 being defined as 100. Smaller index values indicate lower rolling resistance and superior fuel consumption performance.

TABLE 1

|  |  | Comparative Example 1 | Comparative Example 2 | Comparative Example 3 | Comparative Example 4 |
|---|---|---|---|---|---|
| SBR 1 | Part by mass |  |  | 34.38 (25) | 34.38 (25) |
| SBR 2 | Part by mass | 137.5 (100) | 103.13 (75) | 103.13 (75) | 103.13 (75) |
| SBR 3 | Part by mass |  | 34.38 (25) |  |  |
| CB-1 | Part by mass | 70 | 70 |  | 50 |
| CB-2 | Part by mass |  |  | 70 |  |
| Silica | Part by mass | 35 | 35 | 35 | 55 |
| Coupling agent | Part by mass | 3.5 | 3.5 | 3.5 | 5.5 |
| Resin-1 | Part by mass | 20 | 20 | 20 | 20 |
| Resin-2 | Part by mass |  |  |  |  |
| Resin-3 | Part by mass |  |  |  |  |
| Oil | Part by mass | 40 | 40 | 40 | 40 |
| CB ratio CB/(CB + silica) | % | 66.7 | 66.7 | 66.7 | 47.6 |
| Total oil components | (Part by mass) | (78) | (78) | (78) | (78) |
| Dry grip performance | Index value | 100 | 92 | 89 | 92 |
| Wet grip performance | Index value | 100 | 96 | 117 | 126 |
| Rolling resistance | Index value | 100 | 80 | 73 | 78 |

|  |  | Comparative Example 5 | Comparative Example 6 | Comparative Example 7 |
|---|---|---|---|---|
| SBR 1 | Part by mass | 34.38 (25) | 34.38 (25) | 34.38 (25) |
| SBR 2 | Part by mass | 103.13 (75) | 103.13 (75) | 103.13 (75) |

TABLE 1-continued

| SBR 3 | Part by mass |  |  |  |
| CB-1 | Part by mass | 70 | 70 | 70 |
| CB-2 | Part by mass |  |  |  |
| Silica | Part by mass | 35 | 35 | 35 |
| Coupling agent | Part by mass | 3.5 | 3.5 | 3.5 |
| Resin-1 | Part by mass | 40 |  |  |
| Resin-2 | Part by mass |  | 20 |  |
| Resin-3 | Part by mass |  |  | 20 |
| Oil | Part by mass | 20 | 40 | 40 |
| CB ratio CB/(CB + silica) | % | 66.7 | 66.7 | 66.67 |
| Total oil components | (Part by mass) | (58) | (78) | (78) |
| Dry grip performance | Index value | 128 | 119 | 93 |
| Wet grip performance | Index value | 130 | 128 | 103 |
| Rolling resistance | Index value | 106 | 104 | 78 |

TABLE 2

|  |  | Example 1 | Example 2 | Example 3 | Example 4 |
|---|---|---|---|---|---|
| SBR 1 | Part by mass | 34.38 (25) | 13.85 (10) | 34.38 (25) | 34.38 (25) |
| SBR 2 | Part by mass | 103.13 (75) | 123.75 (90) | 103.13 (75) |  |
| SBR 3 | Part by mass |  |  |  | 103.13 (75) |
| CB-1 | Part by mass | 70 | 70 | 57 | 70 |
| Silica | Part by mass | 35 | 35 | 48 | 35 |
| Coupling agent | Part by mass | 3.5 | 3.5 | 4.8 | 3.5 |
| Resin-1 | Part by mass | 20 | 20 | 20 | 20 |
| Oil | Part by mass | 40 | 40 | 40 | 40 |
| CB ratio CB/(CB + silica) | % | 66.7 | 66.7 | 54.3 | 66.7 |
| Total oil components | (part by mass) | (78) | (78) | (78) | (78) |
| Dry grip performance | Index value | 110 | 107 | 107 | 102 |
| Wet grip performance | Index value | 120 | 118 | 125 | 125 |
| Rolling resistance | Index value | 85 | 80 | 78 | 80 |

The types of the raw materials that were used in Tables 1 and 2 are as follows.

SBR 1: solution-polymerized styrene-butadiene rubber; E680 available from Asahi Kasei Chemicals Corporation; styrene content: 36 mass %; vinyl content: 64%; glass transition temperature: −13° C.; weight average molecular weight: 1470000; oil extended product prepared by adding 37.5 parts by mass of the oil component to 100 parts by mass of SBR SBR 2: emulsion-polymerized styrene-butadiene rubber; Nipol 1739 available from the Zeon Corporation; styrene content: 40 mass %; vinyl content: 14%; glass transition temperature: −31° C.; weight average molecular weight: 720000; oil extended product prepared by adding 37.5 parts by mass of the oil component to 100 parts by mass of SBR SBR 3: solution-polymerized styrene-butadiene rubber; E581 available from Asahi Kasei Chemicals Corporation; styrene content: 37 mass %; vinyl content: 42%; glass transition temperature: −27° C.; weight average molecular weight: 1260000; oil extended product prepared by adding 37.5 parts by mass of the oil component to 100 parts by mass of SBR CB 1: carbon black; CD2019 available from Columbia Carbon Corporation, N$_2$SA: 340 m$^2$/g CB 2: carbon black; SEAST 9 available from Tokai Carbon Co., Ltd.; Carbon black 3: N$_2$SA: 142 m$^2$/g Silica: Zeosil 1165MP available from Rhodia; N$_2$SA: 165 m$^2$/g Coupling agent: bis(3-triethoxysilylpropyl) tetrasulfide; Si 69 available from Evonik Degussa Resin 1: aromatic modified terpene resin with softening point of 125° C.; YS Resin TO-125 available from Yasuhara Chemical Co., Ltd.

Resin 2: aromatic modified terpene resin with softening point of 145° C.; YS Resin TO-145 available from Yasuhara Chemical Co., Ltd.

Resin 3: aromatic modified terpene resin with softening point of 85° C.; YS Resin TO-85, available from Yasuhara Chemical Co., Ltd.

Oil: Extract No. 4S available from Showa Shell Sekiyu K.K.

TABLE 3

| Common formulation of the rubber compositions | |
|---|---|
| Zinc white | 3.0 Part by mass |
| Stearic acid | 1.0 Part by mass |
| Anti-aging agent | 3.0 Part by mass |
| Sulfur | 1.5 Part by mass |
| Vulcanization accelerator 1 | 2.0 Part by mass |
| Vulcanization accelerator 2 | 1.0 Part by mass |

The types of raw materials used as per Table 3 are described below.

Zinc oxide: Zinc Oxide III available from Seido Chemical Industry Co., Ltd.

Stearic acid: Beads Stearic Acid YR available from NOF Corp.

Anti-aging agent: 6PPD available from Flexsys

Sulfur: "Golden Flower" oil-treated sulfur powder available from Tsurumi Chemical Industry, Co., Ltd.

Vulcanization accelerator 1: sulfenamide-based vulcanization accelerator CBS; NOCCELER CZ-G available from Ouchi Shinko Chemical Industrial Co., Ltd.

Vulcanization accelerator 2: thiuram-based vulcanization accelerator TOT-N; NOCCELER TOT-N available from Ouchi Shinko Chemical Industrial Co., Ltd.

As is clear from Table 2, it was confirmed that the tire rubber compositions of Examples 1 to 4 exhibited excellent dry grip performance, wet grip performance, and low rolling resistance.

Since the tire rubber composition of Comparative Example 2 does not contain the styrene-butadiene rubber SBR 1 and the glass transition temperature of the styrene-butadiene rubber SBR 3 is lower than −20° C., the dry grip performance and the wet grip performance are poor.

Since the N$_2$SA of the carbon black CB-2 of the tire rubber composition of Comparative Example 3 is less than 200 m$^2$/g, the dry grip performance is poor.

Since the compounded amount of the carbon black is smaller than the compounded amount of the silica in the tire rubber composition of Comparative Example 4, the dry grip performance is poor.

Since the compounded amount of the hydrocarbon resin (resin-1) exceeds 30 parts by mass in the tire rubber composition of Comparative Example 5, the rolling resistance becomes large.

Since the softening point of the hydrocarbon resin (resin-2) exceeds 140° C. in the tire rubber composition of Comparative Example 6, the rolling resistance becomes large.

Since the softening point of the hydrocarbon resin (resin-3) is less than 100° C. in the tire rubber composition of Comparative Example 7, the dry grip performance is poor.

REFERENCE SIGN LIST

1: Tread portion
10A, 10b: Tread rubber layers

The invention claimed is:

1. A tire rubber composition produced by compounding from 1 to 50 parts by mass of silica, carbon black in an amount not less than the amount of the silica, and from 10 to 30 parts by mass of a hydrocarbon resin having a softening point from 100 to 140° C. with 100 parts by mass of a diene rubber containing not less than 5 mass % and less than 30 mass % of a styrene-butadiene rubber; the styrene-butadiene rubber having a styrene content from 30 to 40 mass %, a glass transition temperature from −20 to −5° C., and a weight average molecular weight from 1,000,000 to 1,800,000; a nitrogen adsorption specific surface area of the carbon black being from 200 to 400 m$^2$/g; and a nitrogen adsorption specific surface area of the carbon black being greater than a nitrogen adsorption specific surface area of the silica.

2. The tire rubber composition according to claim 1, wherein the styrene-butadiene rubber is a solution-polymerized styrene-butadiene rubber, and the tire rubber composition further contains from 70 to 95 mass % of an emulsion-polymerized styrene-butadiene rubber per 100 mass % of the diene rubber.

3. The tire rubber composition according to claim 2, wherein the hydrocarbon resin is an aromatic modified terpene resin, and a softening point of the aromatic modified terpene resin is from 105 to 130° C.

4. The tire rubber composition according to claim 2, wherein a thiuram-based vulcanization accelerator is further compounded in an amount from 0.5 to 5 parts by mass per 100 parts by mass of the diene rubber.

5. The tire rubber composition according to claim 2, wherein the tire rubber composition forms a tread of a pneumatic tire.

6. The tire rubber composition according to claim 1, wherein the hydrocarbon resin is an aromatic modified terpene resin, and a softening point of the aromatic modified terpene resin is from 105 to 130° C.

7. The tire rubber composition according to claim 6, wherein a thiuram-based vulcanization accelerator is further compounded in an amount from 0.5 to 5 parts by mass per 100 parts by mass of the diene rubber.

8. The tire rubber composition according to claim 6, wherein the tire rubber composition forms a tread of a pneumatic tire.

9. The tire rubber composition according to claim 1, wherein a thiuram-based vulcanization accelerator is further compounded in an amount from 0.5 to 5 parts by mass per 100 parts by mass of the diene rubber.

10. The tire rubber composition according to claim 9, wherein the tire rubber composition forms a tread of a pneumatic tire.

11. The tire rubber composition according to claim 1, wherein the tire rubber composition forms a tread of a pneumatic tire.

12. A pneumatic tire comprising the tire rubber composition according to claim 1.

13. A pneumatic tire comprising the tire rubber composition according to claim 2.

14. A pneumatic tire comprising the tire rubber composition according to claim 6.

15. A pneumatic tire comprising the tire rubber composition according to claim 9.

16. A pneumatic tire comprising the tire rubber composition according to claim 11.

\* \* \* \* \*